US008219295B2

(12) United States Patent
Oue et al.

(10) Patent No.: US 8,219,295 B2
(45) Date of Patent: Jul. 10, 2012

(54) ENGAGING-FORCE CONTROL APPARATUS AND METHOD

(75) Inventors: Tomoko Oue, Yokohama (JP); Morimasa Yamawaki, Yokohama (JP)

(73) Assignee: Jatco Ltd, Fuji-shi (JP)

( * ) Notice: Subject to any disclaimer, the term of this patent is extended or adjusted under 35 U.S.C. 154(b) by 658 days.

(21) Appl. No.: 12/392,536

(22) Filed: Feb. 25, 2009

(65) Prior Publication Data
US 2009/0248266 A1  Oct. 1, 2009

(30) Foreign Application Priority Data

Mar. 29, 2008  (JP) ................. 2008-088876

(51) Int. Cl.
*G06F 7/00* (2006.01)
*G06F 17/00* (2006.01)
*G06F 19/00* (2011.01)
(52) U.S. Cl. .................. 701/68; 192/3.31; 477/169
(58) Field of Classification Search .................. 701/67, 701/68; 192/3.28–3.31; 477/64, 80, 84, 477/168, 169, 174–176
See application file for complete search history.

(56) References Cited

U.S. PATENT DOCUMENTS

| 5,325,946 A | 7/1994 | Kashiwabara et al. |
| 5,667,458 A | 9/1997 | Narita et al. |
| 5,989,156 A | 11/1999 | Matsubara et al. |
| 6,085,136 A | 7/2000 | Katakura et al. |

FOREIGN PATENT DOCUMENTS

| JP | 5-079557 A | 3/1993 |
| JP | 06-185606 A | 7/1994 |
| JP | 07-293685 A | 11/1995 |

*Primary Examiner* — Jeffrey Shapiro
(74) *Attorney, Agent, or Firm* — Foley & Lardner LLP

(57) ABSTRACT

An engaging-force control apparatus for a friction-engagement element controls a slip rotational speed between an input-side rotational speed and an output-side rotational speed of the friction-engagement element by increasing or decreasing an engaging force of the friction-engagement element. The engaging-force control apparatus includes an engaging-force feedback control section configured to control the engaging force of the friction-engagement element to bring the slip rotational speed of the friction-engagement element closer to 0 by way of feedback control; and an engaging-force restricting section configured to restrict the engaging force of the friction-engagement element to prevent the engaging force from exceeding a minimum engaging-force value necessary to maintain the slip rotational speed at 0.

9 Claims, 4 Drawing Sheets

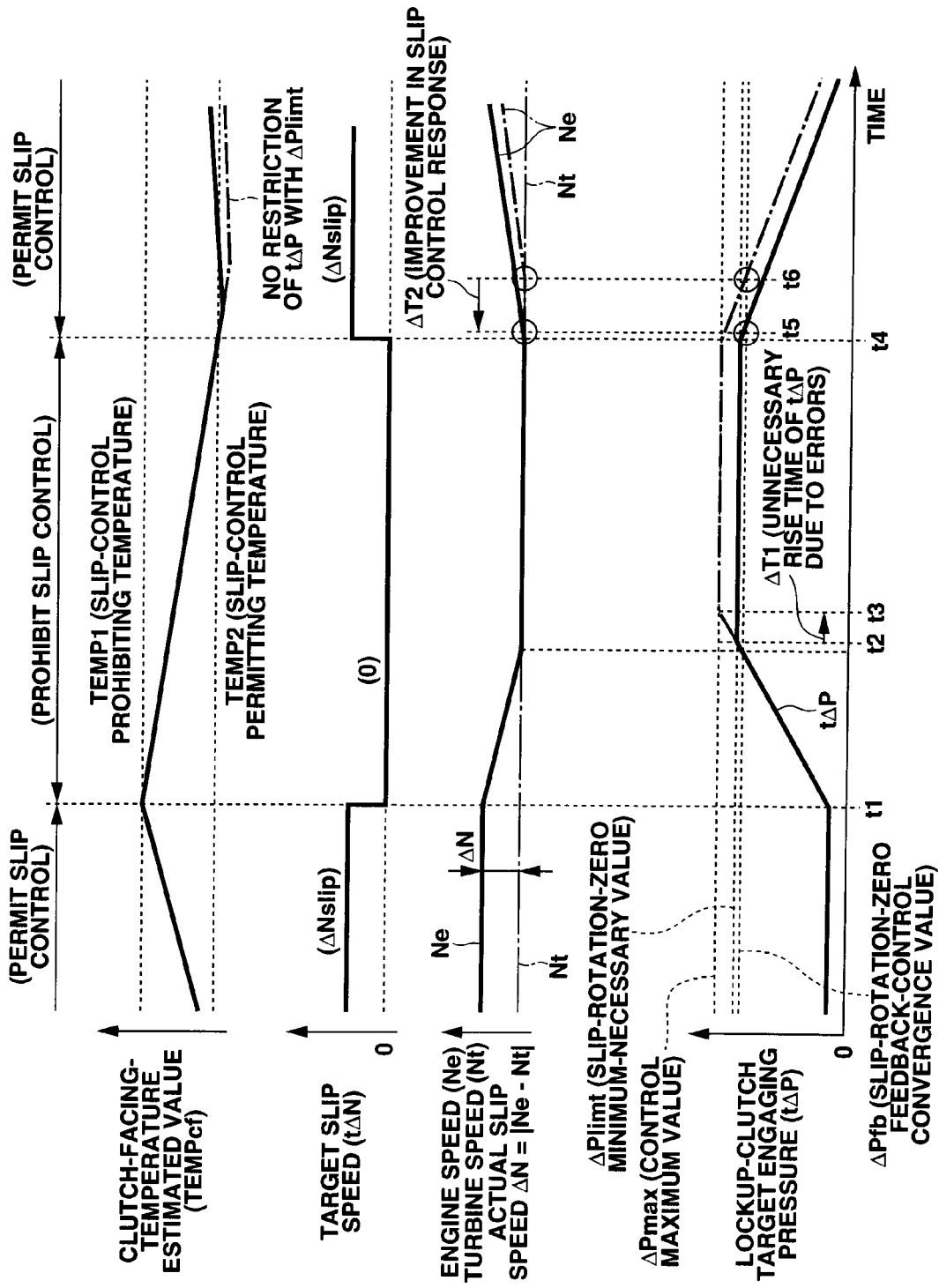

ENGAGING-FORCE CONTROL APPARATUS AND METHOD

BACKGROUND OF THE INVENTION

The present invention relates to control apparatus and method for controlling an engaging force of a friction-engagement element such as a lockup clutch adapted to restrict a relative rotation (slip rotational speed) between input and output elements of a torque converter.

A torque converter transmits power between its input and output elements via fluid. Accordingly, the torque converter has a torque-fluctuation absorbing function and a torque increasing function, but has a low transmission efficiency. Therefore, a lockup-type torque converter is nowadays frequently used. In this lockup-type torque converter, the input and output elements of the torque converter is directly connected (the slip rotational speed is made equal to 0) by engaging a lockup clutch under a running condition where the torque-fluctuation absorbing function and torque increasing function are unnecessary. Alternatively, the slip rotation of the torque converter is restricted by a slip control for the lockup clutch under the running condition where the torque-fluctuation absorbing function and torque increasing function are unnecessary.

Particularly, the present invention relates to, for example, a technique for controlling the engaging force of the friction-engagement element such as the above-mentioned lockup clutch so as to cause a differential rotation (slip rotational speed) between input-side and output-side rotational speeds to become a target slip rotational speed, more particularly a technique for controlling the engaging force of the friction-engagement element to cause an actual slip rotational speed of the friction-engagement element to converge to the target slip rotational speed taking a value equal to 0. Japanese Patent Application publication No. 1993(H05)-079557 discloses a previously proposed control apparatus as one example of such an engaging-force control technique for the friction-engagement element.

In order to control the engaging force of friction-engagement element to cause its slip rotational speed to become the target slip rotational speed taking the value equal to 0, it is conceivable that the engaging force of friction-engagement element is brought to its maximum engaging force value within a controllable range of mechanism.

However, the maximum engaging force value of the friction-engagement element is designed at a higher value than its minimum-necessary engaging force value for causing no slip, to have a margin (allowance) against this minimum-necessary engaging force value, in order to prevent the friction-engagement element from slipping. Hence, when the engaging force of the friction-engagement element is reduced from the above-mentioned maximum engaging force value to an engaging force level for the slip control, the slip control of the friction-engagement element cannot be started until the reduction of an amount of engaging force corresponding to the above-mentioned margin has been completed. That is, when the friction-engagement is transferred from in an engaged state where the friction-engagement is being engaged with the maximum engaging force to in a slip control state where the engaging force of the friction-engagement element is being controlled to cause the actual slip rotational speed to become or maintain a given slip rotational-speed value other than 0, the slip control of the friction-engagement element is started after the reduction of the engaging-force amount corresponding to the above-mentioned margin has been completed. Hence, there is a problem that a response delay of the slip control becomes great by that amount.

In order to solve this problem, in the disclosure of above Japanese Patent Application, when the lockup clutch of torque converter is made under the engaged state where its slip rotational speed is equal to 0 during a coasting running of the vehicle (with a release of accelerator pedal), the engaging force of the lockup clutch is reduced if the slip rotation does not occur and is increased if the slip rotation occurs by means of a learning control. That is, an engaging-force control technique of the friction-engagement element is disclosed in which the engaging force is determined at values obtained by the learning control each of which is a borderline value between the occurrence and non occurrence of slip rotation.

According to this engaging-force control technique of the friction-engagement element, the engaging force of the friction-engagement element is set at a borderline value (boundary) obtained through the learning by judging whether or not the slip rotation is caused. Hence, when the friction-engagement element is brought from its engaged state to its slip control state, it is only necessary to reduce the engaging force of the friction-engagement element from the learning value smaller than the above-mentioned maximum engaging-force value to an engaging force level for the slip control. Thus, the above-mentioned problem that the response delay of slip control is great can be solved.

SUMMARY OF THE INVENTION

However, in the technique disclosed in the above Patent Application, it is inevitable that temporary slips of the friction-engagement element are caused, since the engaging force of the friction-engagement element is provided at a borderline (learning) value capable and incapable of causing the slip rotation of the friction-engagement element by repeating the learning control. The learning control is configured to reduce the engaging force at the time of non-occurrence of slip rotation and to increase the engaging force at the time of occurrence of slip rotation. Hence, the slipping state of the friction-engagement element occurs frequently (i.e., is repeated under the learning control). This generates the concern that a durability of the friction-engagement element is worsened due to early wear-out (abrasion degradation) of a fictional surface of the friction-engagement element (e.g., a clutch facing in the case of lockup clutch).

Moreover, in the above learning control, there is a problem that a convergence of the learning control is worsened when narrowing its control range in order to improve a control accuracy.

Furthermore, in the above learning control, an input-side rotational-speed detection value and an output-side rotational-speed detection value of the friction-engagement element are used when calculating an actual slip rotational speed thereof which is indispensable for this learning control. If these input-side and output-side rotational-speed detection values have some errors, an apparent (erroneous) slip rotation is possibly detected although the actual slip rotational speed of the friction-engagement element is equal to 0 in reality. In this case, the engaging force of the friction-engagement element is unnecessarily enlarged, beyond its (minimum) level causing the slip rotational speed to become equal to 0, so that the engaging force of the friction-engagement element possibly approaches the above-mentioned maximum engaging force value. Accordingly, there is also a concern that the problem regarding the above-mentioned response delay of slip control becomes incapable of being solved even by the learning control.

It is therefore an object of the present invention to provide engaging-force control apparatus and method for a friction-engagement element, devised to solve or ease the problems regarding the durability of the friction-engagement element, regarding the convergence of control, and regarding the response delay at the time of transition to the slip control.

According to one aspect of the present invention, there is provided an engaging-force control apparatus for a friction-engagement element, adapted to control a slip rotational speed between an input-side rotational speed and an output-side rotational speed of the friction-engagement element by increasing or decreasing an engaging force of the friction-engagement element, the engaging-force control apparatus comprising: an engaging-force feedback control section configured to control the engaging force of the friction-engagement element to bring the slip rotational speed of the friction-engagement element closer to 0 by way of feedback control; and an engaging-force restricting section configured to restrict the engaging force of the friction-engagement element to prevent the engaging force from exceeding a minimum engaging-force value necessary to maintain the slip rotational speed at 0.

According to another aspect of the present invention, there is provided an engaging-force control apparatus for a friction-engagement element, comprising: means for controlling an engaging force of the friction-engagement element to bring a slip rotational speed between an input-side rotational speed and an output-side rotational speed of the friction-engagement element closer to 0 by way of feedback control; and means for restricting the engaging force of the friction-engagement element to prevent the engaging force from exceeding a minimum engaging-force value necessary to maintain the slip rotational speed at 0.

According to still another aspect of the present invention, there is provided an engaging-force control method for a friction-engagement element, comprising: controlling an engaging force of the friction-engagement element to bring a slip rotational speed between an input-side rotational speed and an output-side rotational speed of the friction-engagement element closer to 0 by way of feedback control; and restricting the engaging force of the friction-engagement element to prevent the engaging force from exceeding a minimum engaging-force value necessary to maintain the slip rotational speed at 0.

The other objects and features of this invention will become understood from the following description with reference to the accompanying drawings.

BRIEF DESCRIPTION OF THE DRAWINGS

FIG. 4 is an operational time chart based on the control program of FIG. 3 which is compared with an operation in earlier technology.

DETAILED DESCRIPTION OF THE INVENTION

Figure 1:
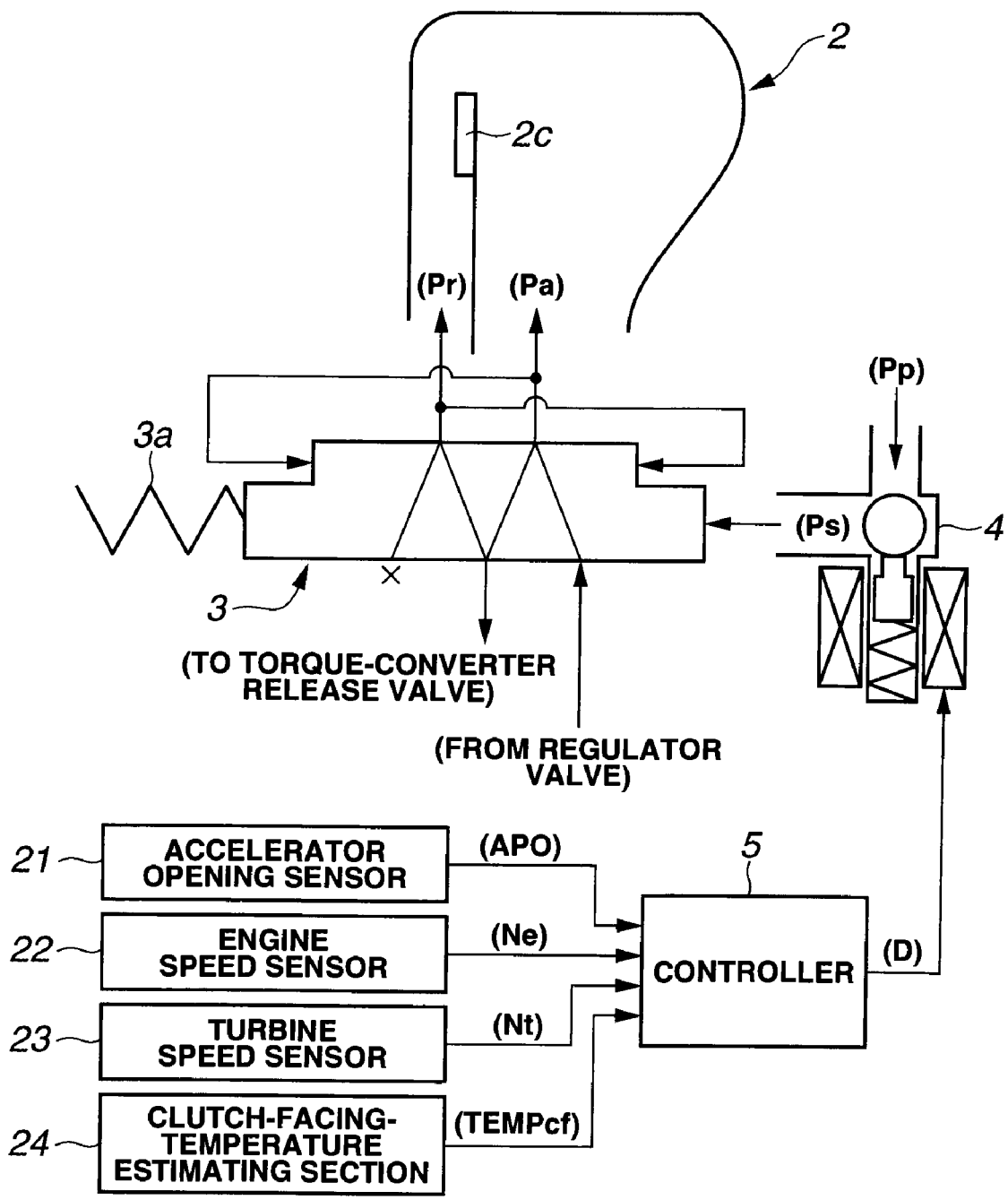
FIG. 1 is a diagram showing a slip control system for a torque converter equipped with an engaging-force control apparatus for a friction-engagement element, in an embodiment according to the present invention.

Hereinafter, embodiments according to the present invention will be explained in detail referring to the drawings.

FIG. 1 shows a lockup control system for a torque converter equipped with an engaging-force control apparatus for a friction-engagement element (clutch), in an embodiment according to the present invention.

Since the basic structure of torque converter 2 is known, detailed illustrations of torque converter 2 will be omitted for the purpose of simplification of the disclosure. Torque converter 2 according to this embodiment is a lockup-type torque converter including a pump impeller as an input element of the torque converter, a turbine runner as an output element of the torque converter, and a lockup clutch 2c. The pump impeller is connected with a crank shaft of an engine (not shown) and is driven by the engine. The turbine runner is connected with an input shaft of a speed-change gear mechanism for an automatic transmission. Lockup clutch 2c functions to regulate or limit a relative rotation between the pump impeller and the turbine runner (i.e., controls a slip of torque converter 2), and functions to bring this relative rotation (slip rotational speed) to equal to zero (i.e., to a lockup state, i.e., direct-connected state).

The engaging force (connecting force) of lockup clutch 2c serving as a friction-engagement element is determined by a lockup-clutch engaging pressure $\Delta P = Pa - Pr$ which is a differential pressure between an apply pressure Pa and a release pressure Pr acting on the front and back of lockup clutch 2c. In the case that apply pressure Pa is lower than or equal to release pressure Pr ($\Delta P \leqq 0$), lockup clutch 2c is released or disengaged so that the lockup clutch 2c does not connect the pump impeller with the turbine runner. Thereby, torque converter 2 is made to function under a converter state where the slip restriction is not imposed.

In the case that apply pressure Pa is greater than release pressure Pr ($\Delta P > 0$), lockup clutch 2c is engaged by a force according to differential pressure $\Delta P$. Thereby, torque converter 2 is made to function under a slip control state where the slip restriction (limitation) is imposed in accordance with the engaging force of lockup clutch 2c.

When the differential pressure between apply pressure Pa and release pressure Pr (i.e., lockup-clutch engaging pressure $\Delta P = Pa - Pr$) becomes greater than a given value, lockup clutch 2c is completely engaged so that the relative rotation between the pump impeller and the turbine runner is eliminated. Thereby, torque converter 2 is made to function under the lockup state where the slip rotational speed is equal to zero.

Apply pressure Pa and release pressure Pr are controlled integrally by a slip control valve 3. This slip control valve 3 is configured to control apply pressure Pa and release pressure Pr in accordance with a signal pressure Ps derived from a lockup solenoid 4. Lockup solenoid 4 is controlled by a controller 5 by means of a duty(-cycle) control. The following explanations for slip control valve 3 and lockup solenoid 4 are given although the basic structures of these slip control valve 3 and lockup solenoid 4 are known.

Figure 2:
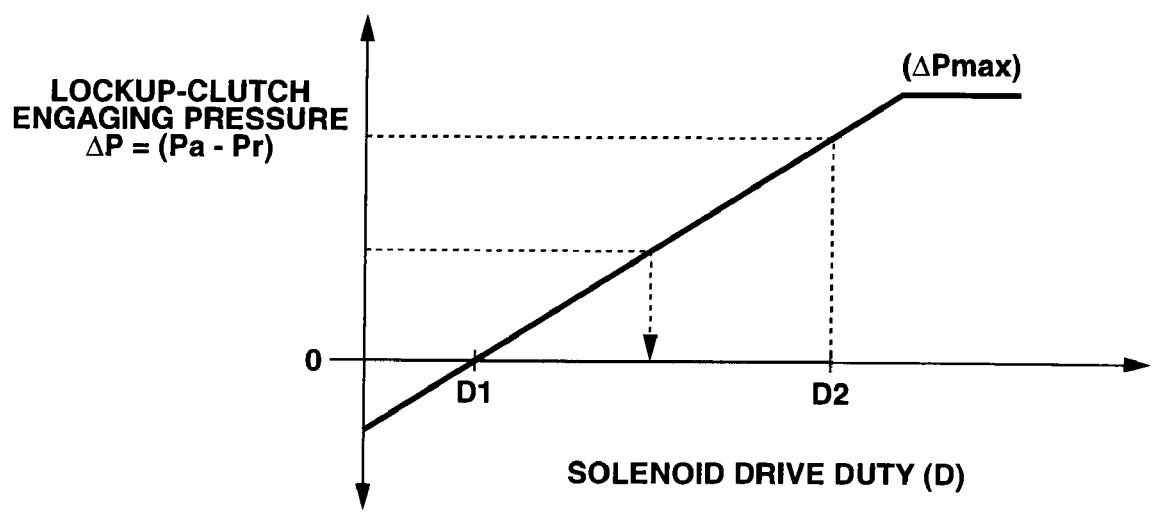
FIG. 2 is a characteristic line map showing the relation between a solenoid drive duty and a lockup-clutch engaging pressure obtainable by the solenoid drive duty, in the embodiment according to the present invention.

That is, lockup solenoid 4 increases signal pressure Ps with the increase of a solenoid drive duty D derived from controller 5, by regarding a constant pilot pressure Pp as its base pressure. Slip control valve 3 receives signal pressure Ps and release pressure Pr (which has been fed back) in one direction, and receives a spring force of a spring 3a and apply pressure Pa (which has been fed back) in the other (opposite) direction. Slip control valve 3 increases the engaging pressure (lockup differential pressure) $\Delta P$ of lockup clutch 2c which is represented by the differential pressure (Pa−Pr) between apply pressure Pa and release pressure Pr, in response to the rise of signal pressure Ps (i.e., in response to the increase of solenoid drive duty D), as shown in an example of FIG. 2. As shown in FIG. 2, the engaging pressure $\Delta P$ is increased from a negative value through 0 into a positive value and further up to a maximum value ΔPmax within a defined control range or controllable range.

While solenoid drive duty D is smaller than a value D1 shown in FIG. 2, namely when lockup-clutch engaging pressure ΔP=(Pa−Pr) takes a negative value; torque converter 2 operates under the converter state because of the relation Pr>Pa. On the contrary, while solenoid drive duty D is greater than value D1 shown in FIG. 2, namely when lockup-clutch engaging pressure ΔP=(Pa−Pr) takes a positive value; torque converter 2 operates under the slip control state where the slip rotation of torque converter 2 is limited more greatly as this taken positive value is greater, by increasing an engagement capacity of lockup clutch 2c. When solenoid drive duty D becomes greater than or equal to a value D2 of FIG. 2, namely when lockup-clutch engaging pressure ΔP=(Pa−Pr) further rises; lockup clutch 2c is completely engaged so that torque converter 2 operates under the lockup state.

Controller 5 functioning to calculate or determine solenoid drive duty D receives a signal derived from an accelerator opening sensor 21, a signal derived from an engine rotational-speed sensor 22, a signal derived from a turbine rotational-speed sensor 23, and a signal derived from a clutch-facing-temperature estimating section 24. Accelerator opening sensor 21 serves to sense an accelerator opening APO indicating a required engine load. Engine rotational-speed sensor 22 serves to sense an engine rotational speed Ne (i.e., an input rotational speed of torque converter 2). Turbine rotational-speed sensor 23 serves to sense a rotational speed Nt of the turbine runner (i.e., an output rotational speed of torque converter 2). Clutch-facing-temperature estimating section 24 serves to sense a temperature TEMPcf of a clutch facing of lockup clutch 2c.

Since the above-mentioned clutch-facing temperature TEMPcf is a surface temperature, clutch-facing temperature TEMPcf can be estimated by calculation from the engaging force of lockup clutch 2c, the slip rotational speed, a friction coefficient of the clutch facing, or the like.

Figure 3:
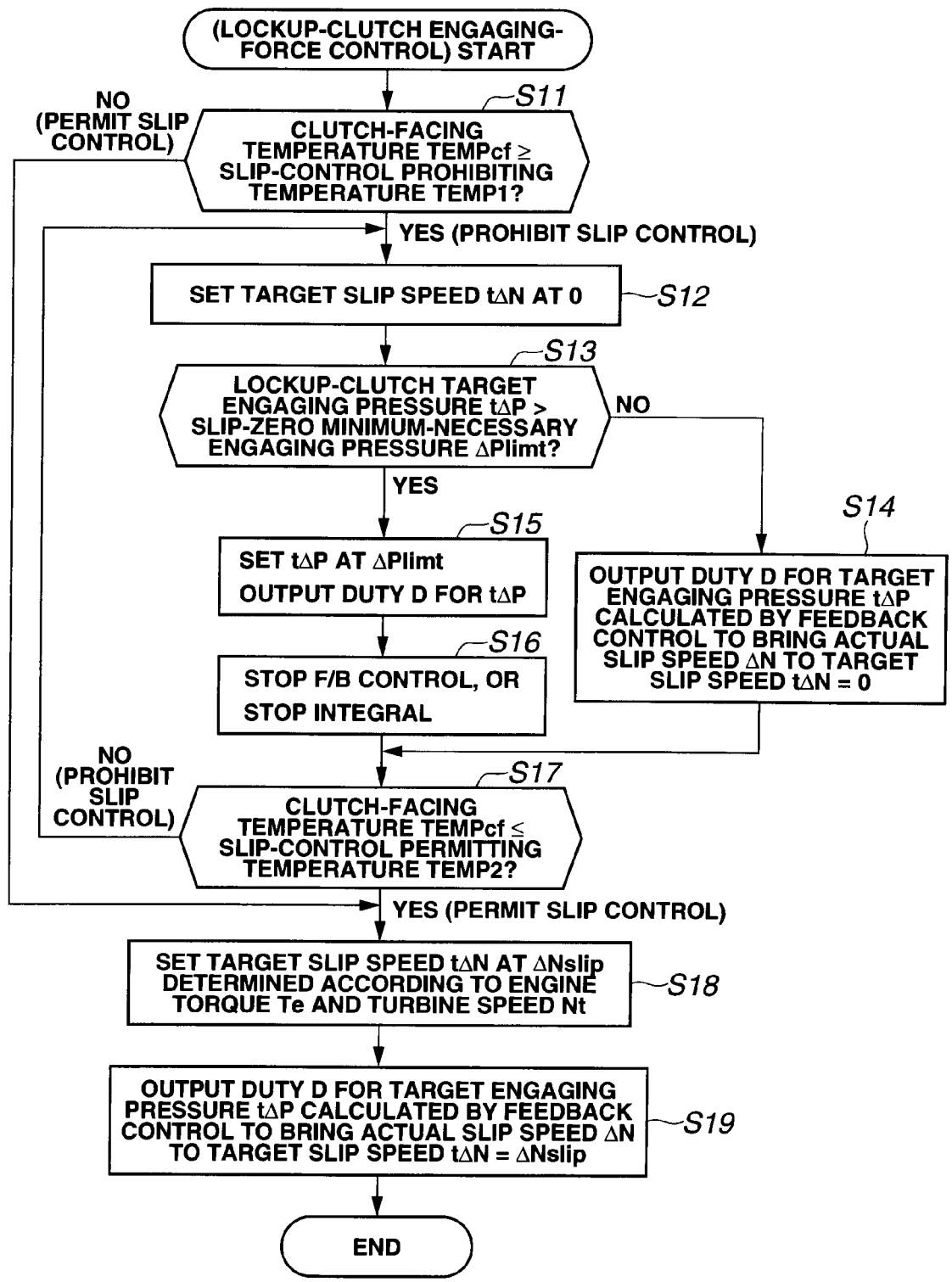
FIG. 3 is a flowchart showing a program related to the engaging-force control for lockup clutch which is executed by a controller in the embodiment according to the present invention.

Controller 5 carries out a control program shown in FIG. 3, on the basis of these input information. In this program, controller 5 determines a command value for lockup-clutch engaging pressure ΔP=(Pa−Pr) in order to perform the engaging-force control of lockup clutch 2c (friction-engagement element) according to the present invention. Then, controller 5 determines drive duty D corresponding to this command value for lockup-clutch engaging pressure ΔP=(Pa−Pr), on the basis of a map corresponding to FIG. 2, and supplies this drive duty D to lockup solenoid 4.

The control program of FIG. 3 includes a normal engaging-force control for controlling the slip of lockup clutch 2c of torque converter, and a non-slip engaging-force control for causing the slip rotational speed of lockup clutch 2c to become equal to 0. The normal engaging-force control is carried out before a (instant) time point t1 of FIG. 4 and also after a time point t4. The non-slip engaging-force control is carried out after time point t1 and before time point t4 (i.e., carried out during a time period between t1 and t4). Time point t1 is a point when clutch-facing temperature TEMPcf (estimated value) reaches or becomes higher than a slip-control prohibiting temperature TEMP1 shown in FIG. 4. Time point t4 is a point when clutch-facing temperature TEMPcf reaches or becomes lower than a slip-control permitting temperature TEMP2 shown in FIG. 4. In the non-slip engaging-force control, the slip control of torque converter 2 which is conducted by the slipping engagement of lockup clutch 2c is prohibited in order to prevent an overheat. That is, for the time period between t1 and t4, an actual slip rotational speed ΔN=|Ne−Nt| which is a difference between input rotational speed (engine rotational speed) Ne and the output rotational speed (turbine rotational speed) Nt of torque converter 2 is brought to 0 by achieving an engagement which forces the front-to-back rotational-speed difference (slip rotational speed) of lockup clutch 2c to become equal to 0. Thereby, the above-mentioned overheat prevention is achieved.

Slip-control prohibiting temperature TEMP1 has a relation TEMP1>TEMP2 with slip-control permitting temperature TEMP2 as shown in FIG. 4, and a hysteresis (range) is set between these two values TEMP1 and TEMP2 for the prevention of a hunting in control.

In the control program of FIG. 3, at first at step S11, it is judged or checked whether the slip control should be prohibited or not, i.e., whether lockup clutch 2c is in an overheated state or not, by judging whether or not clutch-facing temperature TEMPcf (estimated value) is greater than or equal to slip-control prohibiting temperature TEMP1. If it is determined that clutch-facing temperature TEMPcf (estimated value) is not within a high temperature range indicating the overheated state at step S11; a temperature condition causing no harm in carrying out the slip control is satisfied, for example, at any time before time point t1 or after time point t4 of FIG. 4. Hence, the program proceeds to steps S18 and S19. The slip control for torque converter 2 is carried out by means of the following slipping engagement of lockup clutch 2c.

At step S18, a target slip rotational speed tΔN for torque converter 2 (lockup clutch 2c) is set at a value ΔNslip determined according to an engine torque Te (which is estimated from accelerator opening APO, engine rotational speed Ne, or the like) and turbine rotational speed Nt, in the similar manner as the execution of an ordinary slip control.

At next step S19, a target engaging pressure tΔP for lockup clutch 2c is calculated so that the engaging force of lockup clutch 2c is controlled by way of feedback control to bring actual slip rotational speed ΔN=|Ne−Nt| of torque converter 2 (lockup clutch 2c) closer to the above-mentioned target slip rotational speed tΔN (=ΔNslip). Controller 5 calculates (a value of) solenoid drive duty D corresponding to target engaging pressure tΔP, from the map corresponding to FIG. 2, and outputs this solenoid drive duty D to solenoid 4. That is, the engaging force of lockup clutch 2c is feedback-controlled so as to conform actual slip rotational speed ΔN to target slip rotational speed tΔN.

The feedback control is conducted by using PID (P: proportional, I: integral, D: derivative) control. In this feedback control, the above-mentioned target engaging pressure tΔP can be calculated from a sum of a proportional control quantity (proportional controlled-variable), an integral control quantity, and a derivative control quantity. This proportional control quantity is calculated by multiplying a proportional-control constant by a slip rotational deviation between actual slip rotational speed ΔN and target slip rotational speed tΔN. The integral control quantity is calculated by multiplying an integral-control constant by a value of integral of the slip rotational deviation. The derivative control quantity is calculated by multiplying a derivative-control constant by a derivative value of the slip rotational deviation.

The above-detailed feedback control is carried out, in the case where the slip control has been permitted because clutch-facing temperature TEMPcf (estimated value) is not within the high temperature range indicative of the overheated state. For example, at any time point before time point t1 of FIG. 4, the engaging force (target engaging pressure tΔP) of lockup clutch 2c is controlled by way of feedback control so as to bring actual slip rotational speed ΔN to target slip rotational speed tΔN (=ΔNslip).

When clutch-facing temperature TEMPcf (estimated value) becomes higher than or equal to slip-control prohibiting temperature TEMP1 (at time point t1 of FIG. 4) as a result of continuation of such a slip control; the program proceeds from step S11 to steps S12-S16. Thereby, the above-mentioned overheated state is avoided by prohibiting or suspending the slip control in the following manner.

At first at step S12, target slip rotational speed $t\Delta N$ is set at 0 for the purpose of slip control prohibition, as shown at time point t1 of FIG. 4. Next at step S13, it is judged whether or not lockup-clutch target engaging pressure $t\Delta P$ representing a current engaging force of lockup clutch 2c is greater than a slip-rotation-zero minimum-necessary engaging pressure $\Delta$Plimt.

This slip-rotation-zero minimum-necessary engaging pressure $\Delta$plimt is an engaging pressure of lockup clutch 2c corresponding to a minimum engaging force necessary to cause slip rotational speed $\Delta N$ of lockup clutch 2c to become equal to 0 (i.e., to eliminate the slip rotation). This slip-rotation-zero minimum-necessary engaging pressure $\Delta$Plimt may be preliminarily calculated through experiments or the like in consideration of its dispersion and the like. Alternatively, slip-rotation-zero minimum-necessary engaging pressure $\Delta$Plimt may use a value which has been calculated by a learning during the lockup control. For example, slip-rotation-zero minimum-necessary engaging pressure $\Delta$Plimt is a value as shown in FIG. 4. Therefore, as a matter of course, this embodiment is not limited to the case where slip-rotation-zero minimum-necessary engaging pressure $\Delta$Plimt (minimum-necessary engaging force value which is at least necessary to force slip rotational speed $\Delta N$ of lockup clutch 2c to become 0) is completely equal to its theoretical value causing the slip rotational speed to become 0 in theory.

Initially, when the judgment of step S13 is started; the slip control has been continuously carried out until just before (up to time point t1 of FIG. 4). Hence, target engaging pressure $t\Delta P$ of lockup clutch 2c is lower than slip-rotation-zero minimum-necessary engaging pressure $\Delta$Plimt as shown at time point t1 of FIG. 4. Accordingly, the program proceeds from step S13 to step S14.

At step S14, target engaging pressure $t\Delta P$ for lockup clutch 2c is calculated so that the engaging force of lockup clutch 2c is controlled by way of feedback control to conform actual slip rotational speed $\Delta N=|Ne-Nt|$ of torque converter 2 (lockup clutch 2c) to target slip rotational speed $t\Delta N$ (=0) set at step S12. (A value of) Solenoid drive duty D corresponding to this target engaging pressure $t\Delta P$ is calculated from the map corresponding to FIG. 2, and is outputted to solenoid 4. Also in this feedback control, the PID (P: proportional, I: integral, D: derivative) control mentioned in the explanations of step S19 is used as a matter of course.

In such a feedback control for eliminating or zeroing the slip rotational speed, target engaging pressure $t\Delta P$ for lockup clutch 2c gradually increases from a value given under the slip control so as to enlarge the engaging force of lockup clutch 2c, as shown in an area after time point t1 of FIG. 4. Thereby, actual slip rotational speed $\Delta N$ of torque converter 2 (lockup clutch 2c) is gradually decreased as shown in the area after time point t1 of FIG. 4, and then finally becomes equal to 0 set as the target value. Thereby, torque converter 2 becomes in an engaged state where slip rotational speed $\Delta N$ is equal to 0.

During such a feedback control that causes torque converter 2 to become under the engaged state where slip rotational speed $\Delta N$ is 0, lockup-clutch target engaging pressure $t\Delta P$ increased as shown in the area after time point t1 of FIG. 4 is supposed to stabilize at a slip-rotation-zero feedback-control convergence value $\Delta$Pfb shown in FIG. 4 under an ideal condition after the slip rotational speed $\Delta N$ has become equal to 0.

However, the input-side rotational-speed detection value (Ne) and the output-side rotational-speed detection value (Nt) of lockup clutch 2c which are used when calculating actual slip rotational speed $\Delta N$ indispensable for the above-mentioned feedback control have errors. These errors are inevitable from the following reasons.

For example, a phase difference occurs between a spot to sense input-side rotational speed Ne of lockup clutch 2c and a spot to sense output-side rotational speed Nt of lockup clutch 2c, due to a torsion of drive transmission system based on a transfer torque itself, a transfer torque fluctuation or the like. Moreover, there is a possibility that a period (cycle) to sense input-side rotational speed Ne of lockup clutch 2c is different from a period (cycle) to sense output-side rotational speed Nt of lockup clutch 2c. Furthermore, differences in signal delay and in calculation response between input-side rotational speed Ne and output-side rotational speed Nt cannot be prohibited from occurring.

The errors of input-side rotational-speed detection value (Ne) and output-side rotational-speed detection value (Nt) sometimes cause actual slip rotational speed $\Delta N$ of lockup clutch 2c to pretend to (apparently) have a value greater than 0, although actual slip rotational speed $\Delta N$ has already reached the target value equal to 0 in reality. In this case, a slip rotational difference between this apparent value (pretended calculation value produced imaginarily due to above-mentioned errors) of actual slip rotational speed $\Delta N$ and the target slip rotational speed (=0) is integrated to the above-mentioned value of integral. Mainly due to this integration of apparent values (pretended values), the above-mentioned feedback control including the integral control unnecessarily increases target engaging pressure $t\Delta P$ of lockup clutch 2c in order to bring the apparent value of actual slip rotational speed $\Delta N$ closer to 0 as shown by an alternate long and short dash line of FIG. 4, even through this target engaging pressure $t\Delta P$ has already brought slip rotational speed $\Delta N$ to 0. Then, finally, target engaging pressure $t\Delta P$ is set up to maximum value $\Delta$Pmax of the controllable range, as shown at a time point t3 of FIG. 4 (also see FIG. 2).

In such case where target engaging pressure $t\Delta P$ (engaging force) of lockup clutch 2c is unnecessarily increased, this lockup-clutch target engaging pressure $t\Delta P$ (engaging force) needs to be reduced from control maximum value $\Delta$Pmax as shown in the alternate long and short dash line of FIG. 4 when the slip control is restarted at time point t4 of FIG. 4.

Due to this, a (instant) time point t6 at which lockup-clutch target engaging pressure $t\Delta P$ (engaging force) reaches slip-rotation-zero feedback-control convergence value $\Delta$Pfb and thereby lockup clutch 2c starts to slip, is delayed as shown in FIG. 4. That is, lockup-clutch slip-start time point t6 at which engine rotational speed Ne starts to depart from turbine rotational speed Nt (at which the slip rotation starts to be generated) is delayed as shown by the alternate long and short dash line of FIG. 4. This causes a problem that a response delay of the slip control becomes greater.

Solutions for such a problem will now be explained in detail according to this embodiment. In order to avoid the unnecessary increase of target engaging pressure $t\Delta P$ during the slip-rotation-zero feedback control of step S14, the program is designed to proceed from step S13 to step S15 when the controller determines that target engaging pressure $t\Delta P$ of lockup clutch 2c is greater than slip-rotation-zero minimum-necessary engaging pressure $\Delta$Plimt at step S13 as shown at time point t2 of FIG. 4.

At step S15, this target engaging pressure tΔP is set (fixed) at slip-rotation-zero minimum-necessary engaging pressure ΔPlimt in order to prevent the unnecessary increase of target engaging pressure tΔP. As seen from a time-series variation shown by a solid line of FIG. 4 after time point t2, a limitation is imposed on the increase of target engaging pressure tΔP so as not to allow target engaging pressure tΔP to exceed (become greater than) slip-rotation-zero minimum-necessary engaging pressure Δplimt.

At next step S16, the slip-rotation-zero feedback control (PID control) which has been carried out at step S14 is stopped or suspended to prevent this feedback control from being unnecessarily carried out. Alternatively, the integral (control) of slip rotational deviation may be stopped at step S16 instead of the stop of slip-rotation-zero feedback control (PID control), since the above-mentioned problem is mainly due to the integral control of the slip-rotation-zero feedback control (PID control). Also in the case where the integral is stopped, the considerable effect can be obtained similarly.

The lockup-clutch engaging-force (target engaging pressure tΔP) control for zeroing the slip rotational speed which is performed at steps S12 to 16 as explained above does not generate a heat accompanying the slip because this slip-rotation-zero control gives substantially no slip to lockup clutch 2c. Thereby, clutch-facing temperature TEMPcf can be reduced as shown by a time-series variation after time point t1 of FIG. 4.

By so doing, until time point t4 of FIG. 4 at which clutch-facing temperature TEMPcf reaches slip-control permitting temperature TEMP2 as a result of the reduction thereof, the program returns from step S17 to step S12. That is, at step S17 subsequent to step S14 or 16, it is determined that clutch-facing temperature TEMPcf is higher than slip-control permitting temperature TEMP2 (TEMPcf>TEMP2) until time point t4. From this judgment result, the program proceeds from step S17 to step S12 so as to continue the slip-rotation-zero lockup-clutch engaging-force control (control of target engaging pressure tΔP) by a routine of steps S12 to S16.

When clutch-facing temperature TEMPcf reaches slip-control permitting temperature TEMP2 at time point t4 of FIG. 4, the program proceeds from step S17 to steps S18 and S19 in response to the judgment result of TEMPcf≦TEMP2. Thereby, the above-mentioned slip control is restarted.

By the restart of slip control, target engaging pressure tΔP (engaging force) of lockup clutch 2c is reduced from slip-rotation-zero minimum-necessary engaging pressure ΔPlimt as shown by the solid line of FIG. 4 after time point t4.

Lockup-clutch target engaging pressure tΔP decreases and then reaches slip-rotation-zero feedback-control convergence value ΔPfb at a time point t5 of FIG. 4. At time point t5, lockup clutch 2c starts to slip so that engine rotational speed Ne starts to depart from turbine rotational speed Nt (i.e., slip rotational speed ΔN starts to be generated) as shown by the solid line of FIG. 4. Finally, the slip control is carried out to conform or bring this slip rotational speed ΔN to target value ΔNslip.

According to this embodiment, target engaging pressure tΔP is restricted so as not to become greater than slip-rotation-zero minimum-necessary engaging pressure ΔPlimt during the lockup-clutch engaging-force control for zeroing the slip rotational speed which is carried out at steps S12 to S16 (for the time interval between time points t1 and t4 of FIG. 4). Hence, after target engaging pressure tΔP has increased up to slip-rotation-zero minimum-necessary engaging pressure ΔPlimt, it is avoided that this target engaging pressure tΔP increases further as shown by the alternate long and short dash line between time points t2 and t3 (time interval ΔT1) of FIG. 4, in spite of the above-mentioned rotational-speed detection error or the like. That is, an upper limit of this target engaging pressure tΔP is set at slip-rotation-zero minimum-necessary engaging pressure ΔPlimt as shown by the solid line of FIG. 4.

Accordingly, the reduction of target engaging pressure tΔP (engaging force) of lockup clutch 2c which is necessary when restarting the slip control at time point t4, is executed from slip-rotation-zero minimum-necessary engaging pressure ΔPlimt which is a lower level than control maximum value ΔPmax. Hence, time point t5 at which target engaging pressure tΔP (engaging force) of lockup clutch 2c reaches slip-rotation-zero feedback-control convergence value ΔPfb such that lockup clutch 2c starts to slip, can be advanced by a time interval ΔT2 as compared with time point t6. Therefore, the response delay of the slip control can be improved.

That is, in the structure according to this embodiment, the engaging force of the friction-engagement element is limited so as not to exceed the minimum-necessary engaging force which is a minimum level necessary to eliminate the slip rotation of the friction-engagement element. Accordingly, when transferring the friction-engagement element from in the engaged state where the slip rotational speed is equal to 0 to in the slip control state, the engaging force of friction-engagement element is reduced from the minimum-necessary engaging force which is lower than the above-mentioned maximum engaging force. By virtue of such a structure, the engaging-force reducing operation into an engaging force range for the slip control, namely the transition to the slipping state can be completed quickly. Therefore, the response delay can be effectively suppressed at the time of transition to the slip control.

Moreover, the lockup-clutch engaging-force control for zeroing the slip rotational speed which is carried out at steps S12 to S16 (for the time interval between time points t1 and t4 of FIG. 4) uses a kind of feedback control (PID control) as mentioned above. Hence, the state where lockup clutch 2c is slipping can be more suppressed as compared with the above-mentioned engaging-force control using the learning control in the earlier technology. Thereby, a durability of lockup clutch 2c can be enhanced, and a convergence performance of engaging-force control can be improved.

The above explanations have been given on the assumption that slip-rotation-zero minimum-necessary engaging pressure ΔPlimt is a fixed lockup-clutch engaging pressure value corresponding to a minimum engaging force value necessary to bring or maintain slip rotational speed ΔN of lockup clutch 2c equal to 0. However, it is favorable that slip-rotation-zero minimum-necessary engaging pressure ΔPlimt is set at a higher engaging pressure value as an input torque to lockup clutch 2c becomes greater, for example, by calculating slip-rotation-zero minimum-necessary engaging pressure ΔPlimt in accordance with the engine torque. The reasons come from the following facts.

As the input torque to lockup clutch 2c becomes greater in response to a higher level of engine torque, slip-rotation-zero minimum-necessary engaging pressure ΔPlimt needs to take a higher value which corresponds to the minimum engaging force value necessary to bring or maintain slip rotational speed ΔN of lockup clutch 2c equal to 0. Moreover, there is an individual variability or dispersion in engine torque (input torque to lockup clutch 2c), and torque fluctuations accompany the engine torque (input torque to lockup clutch 2c). These individual variability or dispersion in engine torque and torque fluctuations of the engine torque become more pronounced as the engine torque (input torque to lockup clutch 2c) becomes greater.

From these reasons, a value of slip-rotation-zero minimum-necessary engaging pressure ΔPlimt which can reliably eliminate slip rotation ΔN of lockup clutch 2c when the engine torque (input torque to lockup clutch 2c) is relatively small, possibly generates some slip of lockup clutch 2c so as to fail to reliably maintain slip rotational speed ΔN of lockup clutch 2c at 0 when the engine torque (input torque to lockup clutch 2c) is relatively large. Accordingly, it is needed that slip-rotation-zero minimum-necessary engaging pressure ΔPlimt necessary to bring or maintain slip rotational speed ΔN of lockup clutch 2c equal to 0 is provided as a higher value as the engine torque (input torque to lockup clutch 2c) becomes greater.

In such a case where slip-rotation-zero minimum-necessary engaging pressure ΔPlimt is made higher with the increase of engine torque (input torque to lockup clutch 2c), lockup-clutch target engaging pressure tΔP whose upper limit is set at slip-rotation-zero minimum-necessary engaging pressure ΔPlimt at step S15 (for the period between time points t2 and t4 of FIG. 4) can be suppressed to minimum-necessary levels given depending on the engine torque (input torque to lockup clutch 2c). Thereby, the above-mentioned minimization effect of the response delay of the slip control can be certainly achieved under any level (magnitude) of the engine torque (input torque to lockup clutch 2c).

Moreover in this embodiment, while lockup-clutch target engaging pressure tΔP is being set at slip-rotation-zero minimum-necessary engaging pressure ΔPlimt as its upper limit by step S15 (for the period between time points t2 and t4 of FIG. 4); the slip-rotation-zero feedback control of lockup-clutch target engaging pressure tΔP (engaging force) is being stopped, or the integral (control) of slip rotational deviation which is conducted in this feedback control is being stopped by step S16. Accordingly, the above-mentioned rotational-speed detection error (error portion of slip rotational speed ΔN) is not integrated to the value of integral. Hence, the increase of response delay of the restart of slip control which occurs due to this error can be avoided.

The above explanations referring to FIG. 4 have been given, in the case where the lockup-clutch engaging-force control for zeroing the slip rotational speed is carried out for the time period between the time point (t1) when clutch-facing temperature TEMPcf becomes higher than or equal to slip-control prohibiting temperature TEMP1 and the time point (t4) when clutch-facing temperature TEMPcf becomes lower than or equal to slip-control permitting temperature TEMP2, by monitoring clutch-facing temperature TEMPcf in order to prevent the overheat. However, the present invention is not limited to such a case. For example, a controlled object for the engaging-force control according to the present invention may be an friction element for shift inside the automatic transmission, instead of lockup clutch 2c. Moreover for example, a monitored object for the engaging-force control according to the present invention may be a temperature of working fluid or a selected shift position (selected gear position) in the automatic transmission, instead of clutch-facing temperature TEMPcf. That is, lockup clutch 2c may be engaged to the state where its slip rotational speed is equal to 0 so as not to generate a judder, when the temperature of working fluid in the transmission is relatively low. Lockup clutch 2c may be engaged to the state where its slip rotational speed is equal to 0 when the selected shift position is within high-speed shift positions (corresponding to speed ratios for high speed). Further, the friction element for shift may be engaged to the state where its slip rotational speed is 0. As just mentioned, the present invention is applicable also to engaging-force feedback controls of these cases. As a matter of course, also in such application examples, the similar effects and advantages can be obtained as explained above.

This application is based on a prior Japanese Patent Application No. 2008-088876 filed on Mar. 29, 2008. The entire contents of this Japanese Patent Application are hereby incorporated by reference.

Although the invention has been described above with reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. An engaging-force control apparatus for a friction-engagement element, adapted to control a slip rotational speed between an input-side rotational speed and an output-side rotational speed of the friction-engagement element by increasing or decreasing an engaging force of the friction-engagement element which is determined by a target engaging pressure for the friction-engaging element, the engaging-force control apparatus comprising:

an engaging-force feedback control section configured to control the engaging force of the friction-engagement element to bring the slip rotational speed of the friction-engagement element to 0 by way of feedback control; and an engaging-force restricting section configured to restrict the engaging force of the feedback control of the engaging-force feedback control section to prevent the engaging force of the feedback control from exceeding a minimum engaging-force value necessary to maintain the slip rotational speed at 0, by calculating the target engaging pressure so as to bring the detected slip rotational speed to 0 during the feedback control of the engaging-force feedback control section, if the target engaging pressure is lower than or equal to a minimum engaging-pressure value necessary to maintain the slip rotational speed at 0, and by setting the target engaging pressure at a value equal to the necessary minimum necessary engaging-pressure value, if the target engaging pressure becomes higher than the necessary minimum engaging-pressure valve during the feedback control.

2. The engaging-force control apparatus as claimed in claim 1, wherein the engaging-force restricting section is configured to set the necessary minimum engaging-force value at a greater value as an input torque to the friction-engagement element becomes greater.

3. The engaging-force control apparatus as claimed in claim 1, wherein the necessary minimum engaging-force value is set to have a margin against a maximum engaging-force value given within a controllable range for the friction-engagement element.

4. The engaging-force control apparatus as claimed in claim 1, wherein the engaging-force feedback control section is configured to stop the feedback control of the engaging force during a time period during which the engaging-force restricting section is restricting the engaging force.

5. The engaging-force control apparatus as claimed in claim 1, wherein:

the engaging-force feedback control section is configured to start the feedback control to bring the slip rotational speed of the friction-engagement element closer to 0, when a predetermined condition of the friction-engagement element becomes satisfied;

the engaging-force restricting section is configured to fix a target value for the engaging force to the necessary minimum engaging-force value, from a time point when the target value for the engaging force becomes greater than the necessary minimum engaging-force value until a time point when the predetermined condition becomes not satisfied; and the engaging-force feedback control section is configured to stop the feedback control of the engaging force, from the time point when the target value for the engaging force becomes greater than the necessary minimum engaging-force value until the time point when the predetermined condition becomes not satisfied.

6. The engaging-force control apparatus as claimed in claim 1, wherein:

the engaging-force feedback control section is configured to carry out the engaging-force feedback control for the friction-engagement element in accordance with a value of integral of a deviation between a target slip rotational speed equal to 0 and an actual slip rotational speed of the friction-engagement element; and the engaging-force feedback control section is configured to stop the integral of the deviation during a time period during which the engaging-force restricting section is restricting the engaging force.

7. The engaging-force control apparatus as claimed in claim 1, wherein the friction-engagement element is a lockup clutch adapted to restrict a relative rotation between input and output elements of a torque converter.

8. An engaging-force control apparatus for a friction-engagement element, comprising:

means for controlling an engaging force of the friction-engagement element to bring a slip rotational speed between an input-side rotational speed and an output-side rotational speed of the friction-engagement element to 0 by way of feedback control, wherein the engaging force is determined by a target engaging pressure for the friction-engagement element; and means for restricting the engaging force of the feedback control to prevent the engaging force of the feedback control from exceeding a minimum engaging-force value necessary to maintain the slip rotational speed at 0, by calculating the target engaging pressure so as to bring the detected slip rotational speed to 0 during the feedback control, if the target engaging pressure is lower than or equal to a minimum engaging-pressure value necessary to maintain the slip rotational speed at 0, and by setting the target engaging pressure at a value equal to the necessary minimum engaging-pressure value, if the target engaging pressure becomes higher than the necessary minimum engaging-pressure valve during the feedback control.

9. An engaging-force control method for a friction-engagement element, comprising:

controlling an engaging force of the friction-engagement element to bring a slip rotational speed between an input-side rotational speed and an output-side rotational speed of the friction-engagement element to 0 by way of feedback control, wherein the engaging force is determined by a target engaging pressure for the friction-engagement element; and restricting the engaging force of the feedback control to prevent the engaging force of the feedback control from exceeding a minimum engaging-force value necessary to maintain the slip rotational speed at 0, by calculating the target engaging pressure so as to bring the detected slip rotational speed to 0 during the feedback control, if the target engaging pressure is lower than or equal to a minimum engaging-pressure value necessary to maintain the slip rotational speed at 0, and by setting the target engaging pressure at a value equal to the necessary minimum engaging-pressure value, if the target engaging pressure becomes higher than the necessary minimum engaging-pressure valve during the feedback control.

* * * * *